(12) United States Patent
Cannon et al.

(10) Patent No.: US 7,503,441 B2
(45) Date of Patent: *Mar. 17, 2009

(54) TORQUE CONVERTER

(76) Inventors: Clint D. Cannon, 7610 W. 44th Ave., Wheatridge, CO (US) 80033; Raymond Lewis Elder, II, 2251 S. Corona St., Denver, CO (US) 80210

(*) Notice: Subject to any disclaimer, the term of this patent is extended or adjusted under 35 U.S.C. 154(b) by 357 days.

This patent is subject to a terminal disclaimer.

(21) Appl. No.: 11/092,025

(22) Filed: Mar. 29, 2005

(65) Prior Publication Data

US 2005/0167222 A1   Aug. 4, 2005

(51) Int. Cl.
*F16H 45/02* (2006.01)

(52) U.S. Cl. ............... 192/3.29; 192/70.2; 192/112; 29/889.5

(58) Field of Classification Search .......... 192/3.28–3.3, 192/70.2, 107 R, 107 M, 112
See application file for complete search history.

(56) References Cited

U.S. PATENT DOCUMENTS

| | | | |
|---|---|---|---|
| 4,177,885 A | 12/1979 | Ross | |
| 5,211,270 A | 5/1993 | Tamura et al. | |
| 5,337,867 A | 8/1994 | Kirkwood | |
| 5,441,135 A | 8/1995 | Worner et al. | |
| 5,799,763 A | 9/1998 | Dehrmann | |
| 5,918,713 A | 7/1999 | Shimizu et al. | |
| 6,615,962 B2 * | 9/2003 | Back et al. | 192/3.28 |
| 6,702,079 B2 * | 3/2004 | Bauer et al. | 192/3.29 |
| 6,705,434 B1 | 3/2004 | Bunker | |
| 6,712,186 B1 * | 3/2004 | Arhab | 192/3.29 |

* cited by examiner

*Primary Examiner*—Richard M. Lorence
(74) *Attorney, Agent, or Firm*—Holland & Hart, LLP

(57) ABSTRACT

In one embodiment, a torque converter includes a two-piece cover, an impeller, a turbine, and a lockup clutch. The two-piece cover includes a base plate that is configured for attachment to a drive member. The base plate has a plurality of lugs around the periphery thereof, and at least some of the lugs have straight flanks. The two-piece cover also includes a cylindrical wall piece that is fixed to the base plate. The impeller is fixed to the cylindrical wall piece. The turbine is rotationally mounted between the impeller and the cover and is configured for attachment to a driven member. The lockup clutch is configured to lock the impeller and cover to the turbine when a fluid pressure applied to the lockup clutch increases above a torque converter lockup pressure.

18 Claims, 6 Drawing Sheets

TORQUE CONVERTER

CROSS-REFERENCE TO RELATED APPLICATIONS

This patent application claims priority to the U.S. provisional patent application of Clint D. Cannon entitled "Torque Converter", Ser. No. 60/380,097 (now abandoned), which is hereby incorporated by reference for all that it discloses; and to the U.S. patent application of Clint D. Cannon entitled "Torque Converter", Ser. No. 10/428,278, which is also hereby incorporated by reference for all that it discloses.

BACKGROUND

A vehicle with an automatic transmission requires a torque converter to vary the transfer of torque between the vehicle's engine and transmission. Without a torque converter, a vehicle with an automatic transmission would be unable to keep its engine running while stopped, and would lurch forward (i.e., at the engine's speed) when put into gear.

At idle and low vehicle speeds, components of a torque converter rotate at different speeds (i.e., some components are fixed to the engine and rotate at engine speed, and other components are fixed to the transmission and rotate at less than engine speed or not at all). As a torque converter transfers more and more torque between a vehicle's engine and transmission, a point is reached where all components of a torque converter rotate at or about the same speed. When this point is reached, it is typically desirable to "lock" the components of the torque converter to one another. When in "lockup", a torque converter transfers 100% of an engine's torque to a vehicle's transmission, despite small (and sometimes moderate) changes in an engine's speed.

Torque converter lockup is governed by a lockup clutch. Given the often extreme torsional forces that a lockup clutch is subjected to, its design is critical to the effectiveness and longevity of a torque converter.

SUMMARY OF THE INVENTION

In one embodiment, a torque converter comprises a two-piece cover, an impeller, a turbine, and a lockup clutch. The two-piece cover includes a base plate that is configured for attachment to a drive member. The base plate comprises a plurality of lugs around the periphery thereof, and at least some of the lugs comprise straight flanks. The two-piece cover also comprises a cylindrical wall piece that is fixed to the base plate. The impeller is fixed to the cylindrical wall piece. The turbine is rotationally mounted between the impeller and the cover and is configured for attachment to a driven member. The lockup clutch is configured to lock the impeller and cover to the turbine when a fluid pressure applied to the lockup clutch increases above a torque converter lockup pressure.

Other embodiments of the invention are also disclosed.

BRIEF DESCRIPTION OF THE DRAWINGS

Illustrative embodiments of the invention are illustrated in the drawings, in which.

DETAILED DESCRIPTION OF THE INVENTION

Figure 1:
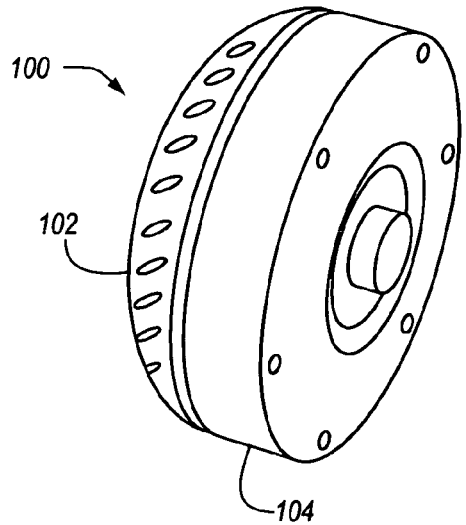
FIG. 1 is a perspective view of an exemplary torque converter.
Figure 2:
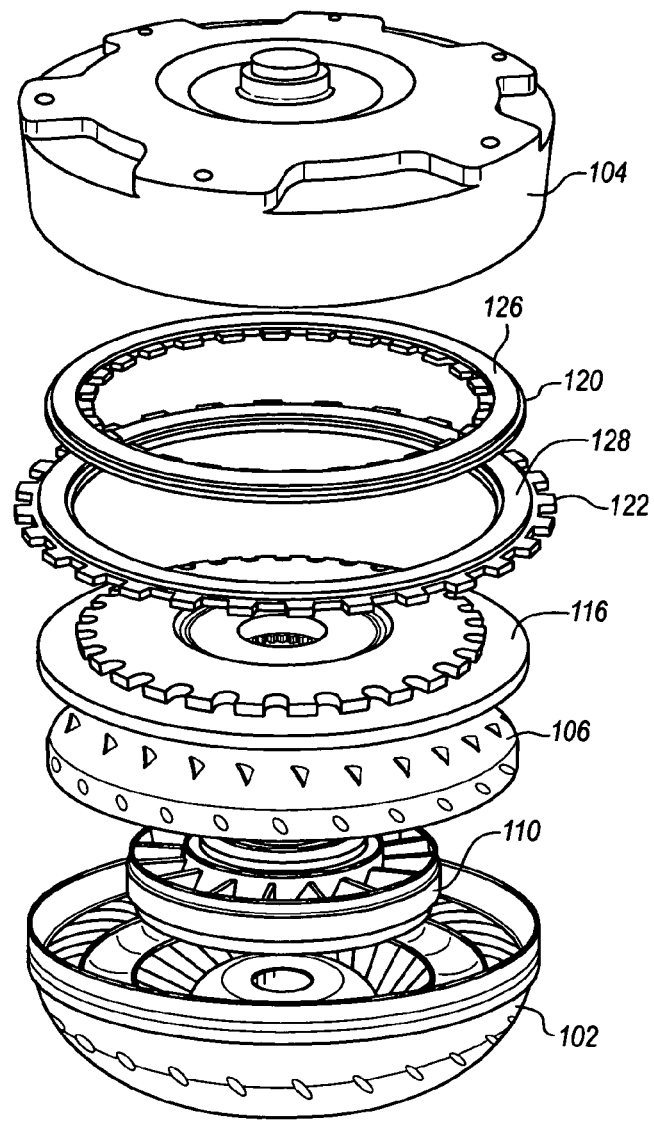
FIG. 2 illustrates a first exploded view of the FIG. 1 torque converter.
Figure 3:
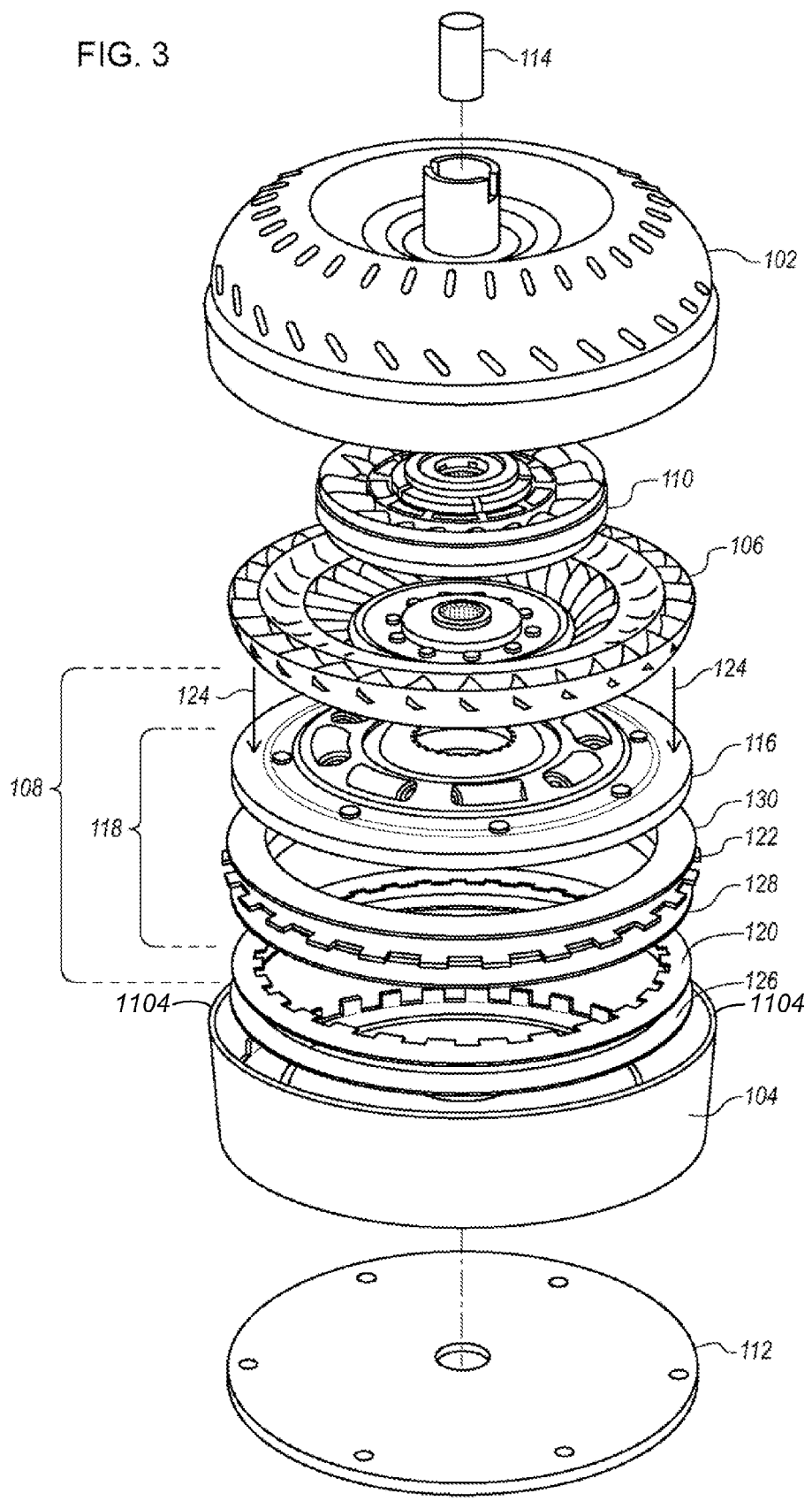
FIG. 3 illustrates a second exploded view of the FIG. 1 torque converter.

A torque converter 100 is generally illustrated in FIGS. 1-3. The torque converter 100 comprises an impeller 102, a cover 104, a turbine 106, a lockup clutch 108, and (optionally, but desirably) a stator 110. The impeller 102 and cover 104 are fixed to one another (i.e., press fitted and/or welded) and are configured for attachment to a drive member 112 (e.g., an engine crankshaft or flywheel). The turbine 106 is rotationally mounted between the impeller 102 and the cover 104 and is configured for attachment to a driven member 114 (e.g., an automatic transmission input shaft). The lockup clutch 108 is generally positioned between the turbine 106 and the cover 104, and has components splined directly or indirectly to both the turbine 106 and the cover 104. The stator 1 10 is positioned between the impeller 102 and the turbine 106.

By way of example, FIG. 3 shows that a drive member 112 may be attached to the cover 104, and a driven member 114 may be attached to the turbine 106 (by means of an axial hole provided in the impeller 102. Alternately, the drive member 112 could be attached to the impeller 102, and the driven member 114 could be attached to the turbine 106 via a hole in the cover 104.

The lockup clutch 108 comprises a piston 116 and a clutch-pack 118. The piston is located between the turbine 106 and the cover 104 and is splined to (and rotates with) the turbine 106. The clutch-pack comprises first and second rings 120, 122, the first of which is splined to (and rotates with) the piston 116. The second of the rings is positioned between the first ring 120 and the piston 116 and is splined to (and rotates with) the cover 104.

When filled with a viscous fluid 124 (e.g., automatic transmission fluid (ATF)), and upon start of a vehicle's engine, the torque converter 100 operates as follows. First, drive member 112 begins to turn at engine speed. Consequently, cover 104 turns at engine speed, and impeller 102 turns at engine speed. The rotation of impeller 102 about the axis of drive member 112 causes the impeller 102 to pump fluid 124 into the turbine 106.

As the impeller 102 pumps fluid into the turbine 106, an engine's power is transferred from the impeller 102 to the turbine 106 via the fluid 124, and the turbine 106 transfers power to a vehicle's transmission via the transmission's input shaft 114. Finally, a vehicle begins to move. But for the stator 110, however, a vehicle would begin to move at a relatively slow rate.

When a driver accelerates from a stop, or accelerates at low vehicle speeds, the rotational speed of the impeller 102 is greater than the rotational speed of the turbine 106. During these low vehicle speeds, the stator 110 redirects fluid 124 as it returns from the turbine 106 so that the direction of the fluid 124 is changed back to that of the impeller 102. The stator 110 is mounted on a one-way clutch that allows it to rotate with the direction of the engine, but not against engine rotation. The one-way clutch locks the stator 110 when the impeller 102 is turning faster than the turbine 106, and the stator 110 redirects fluid flow over the stator vanes in an outward radial direction to increase the amount of engine torque transferred between the impeller 102 and the turbine 106 (i.e., the stator 110 serves as a torque transfer multiplier). The amount of torque multiplication provided by a stator 110 is controlled by the shape of the stator vanes.

When the speed of a torque converter's turbine 106 is equal to (or approximately equal to) the speed of the torque converter's impeller 102, the stator 110 freewheels on its shaft so that fluid flow from the turbine 106 to the impeller 102 is restricted as little as possible, thereby improving torque converter efficiency.

When the speed of a torque converter's turbine 106 is equal to (or approximately equal to) the speed of the torque converter's impeller 102, the torque converter 100 transfers a vehicle's maximum engine torque to the vehicle's transmission (and with a well designed transmission, to the vehicle's wheels). When this occurs, it is typically desirable to hold this state absent a driver's conscious decision to significantly decelerate his or her vehicle. In other words, it is typically desirable to hold a maximum torque transfer state through small (and possibly even moderate) changes in a vehicle's engine speed. Given the difficultly in maintaining the fluid 124 in a constant state, something more is typically required to "lock" the rotational speeds of a torque converter's impeller 102 and turbine 106. This something more is provided by a lockup clutch 108.

Figure 4:
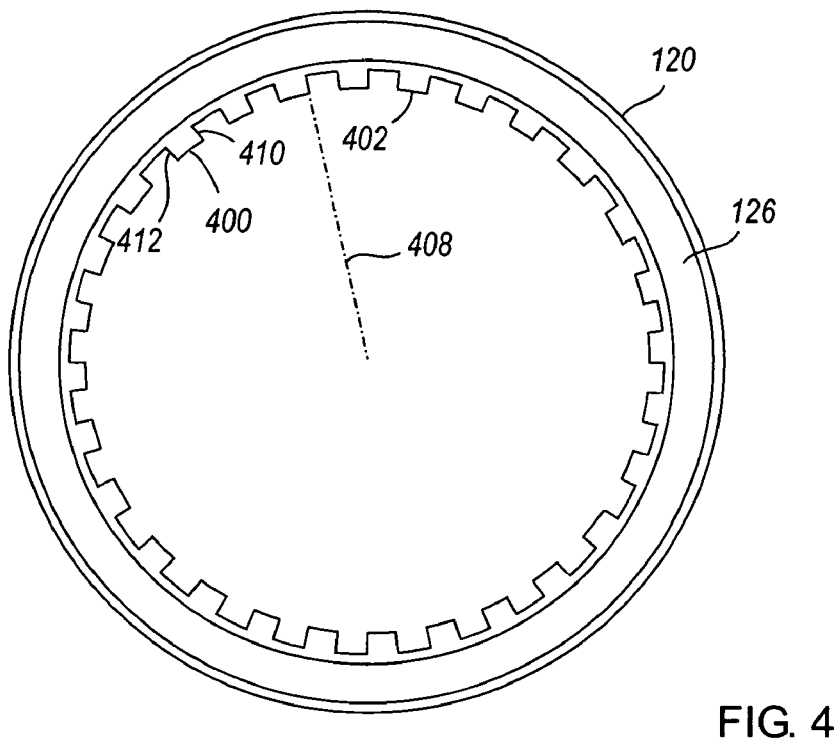
FIG. 4 illustrates a first lockup clutch ring of the FIG. 1 torque converter.
Figure 5:
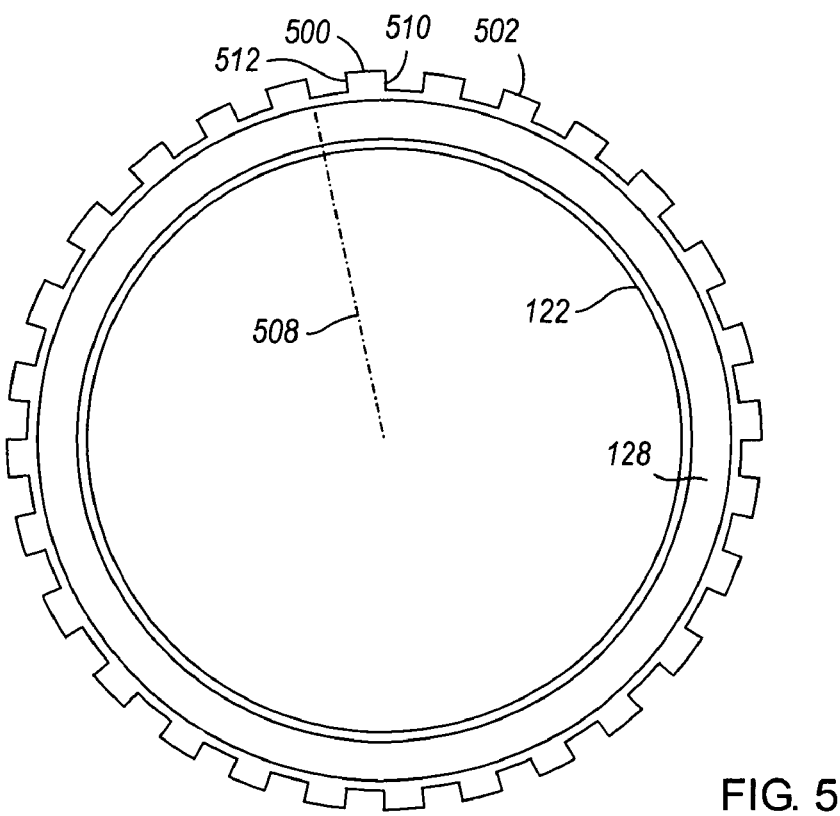
FIG. 5 illustrates a second lockup clutch ring of the FIG. 1 torque converter.

Referring to FIG. 3, one sees that the lockup clutch 108 comprises a piston 116 and a clutch-pack 118. The clutch-pack 118, in turn, comprises first and second rings 120, 122. The first ring 120 comprises a plurality of inwardly facing tabs (e.g., tabs 400, 402; FIG. 4) that are splined to lugs on the piston 116 (see, e.g., tab 400 and lug 600 in FIG. 6). The second ring 122 comprises a plurality of outwardly facing tabs (e.g., tabs 500, 502; FIG. 5) that are splined to lugs on the cover 104 (see, e.g., tab 500 and lug 700 in FIG. 7).

As the impeller 102 directs fluid toward the turbine 106, the turbine 106 moves toward the cover 104, and a fluid pressure between the turbine 106 and the piston 116 gradually increases. As the pressure against the piston 116 increases, the piston 116, rings 120, 122 and cover 104 are compressed toward one another; and, above a torque converter lockup pressure, the piston 116, rings 120, 122 and cover 104 frictionally engage one another and "lock". Fluid 124 that is trapped between the piston 110 and the cover 104 escapes through the shaft of driven member 114. Prior to lockup, fluid 124 flows between the mating surfaces of the cover 104, rings 120, 122 and piston 116 so as to lubricate them as they are compressed together.

Preferably, each of the rings 120, 122 is provided with one or more friction linings 126, 128, 130. By way of example, FIG. 3 shows the first ring 120 having a friction lining 126 on a side thereof adjacent the cover 104, and shows the second ring 122 having friction linings 128, 130 on opposite sides thereof. The cover 104, piston 116 and unlined side of ring 120 comprise clutch surfaces for the friction linings 126-130 to bear against when the piston, rings and cover frictionally engage one another. In this manner, three frictional couplings are created: one between the first ring 120 and the cover 104, one between the first and second rings 120, 122, and one between the second ring 122 and the piston 116.

Note that depending on the composition and texture of the various clutch surfaces, the friction linings 126-130 might not be needed. Furthermore, the friction linings 126-130 could be otherwise distributed among the rings, or even applied to the cover and piston. However, applying the friction linings 126-130 to the rings 120, 122 tends to be easier given current manufacturing processes.

When the torque converter 100 is not in lockup (typically during engine start, during vehicle acceleration from a stop, and during vehicle acceleration at low speeds), the rings 120, 122 of the clutch-pack 118 are subjected to extreme torsional forces. Not only are the rings 120, 122 subjected to broad changes in torsional forces (e.g., as the rotational speed of an engine's crankshaft varies during vehicle acceleration and deceleration), but the rings 120, 122 are also subjected to rapid changes in torsional forces as brief pauses between firings of an engine's cylinders (and even vehicle vibrations) are imparted to the rings 120, 122. These torsionals often lead to premature wear and peaning of the tabs 400, 402, 500, 502 and lugs 600, 700 shown in FIGS. 4-7 and, eventually, to premature failure of a vehicle's torque converter 100. Transmission failure is also possible (i.e., due to the sharing of fluid 124 impregnated with metal filings between the torque converter 100 and transmission).

Figure 6:
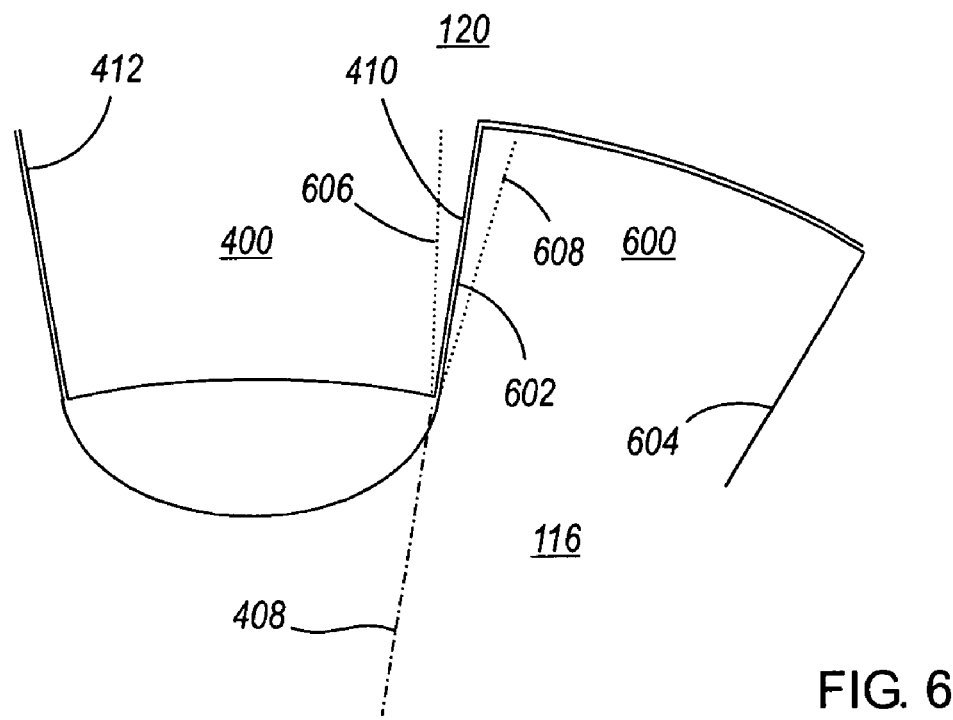
FIGS. 6 & 7 illustrate the tab and lug design of the FIG. 1 torque converter.
Figure 7:
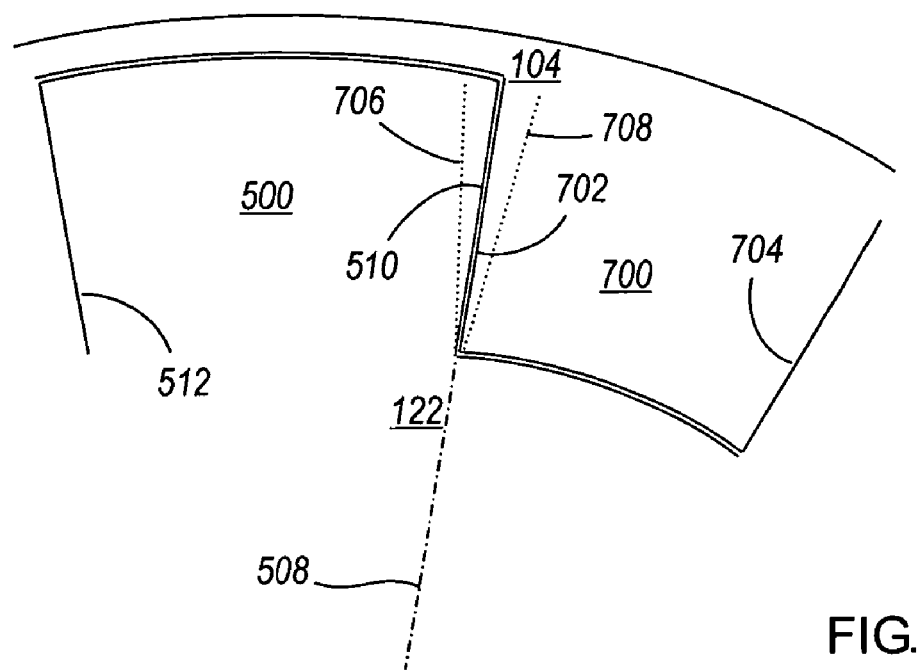
Figure 8:
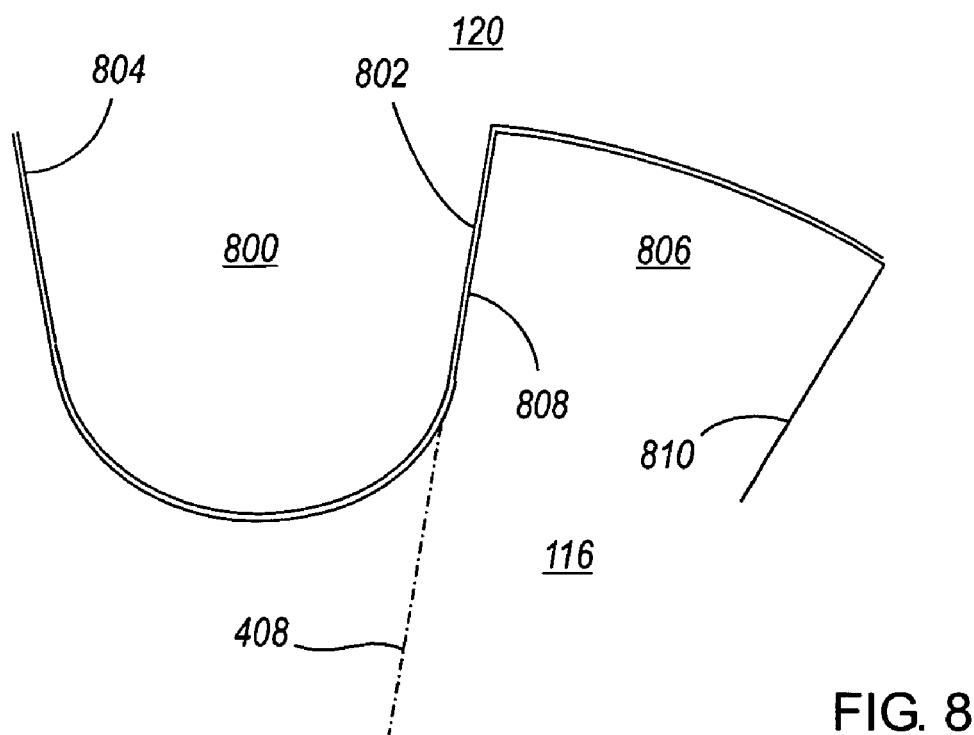
FIGS. 8 & 9 illustrate a first alternative to the tab and lug design illustrated in FIGS. 6 & 7.
Figure 9:
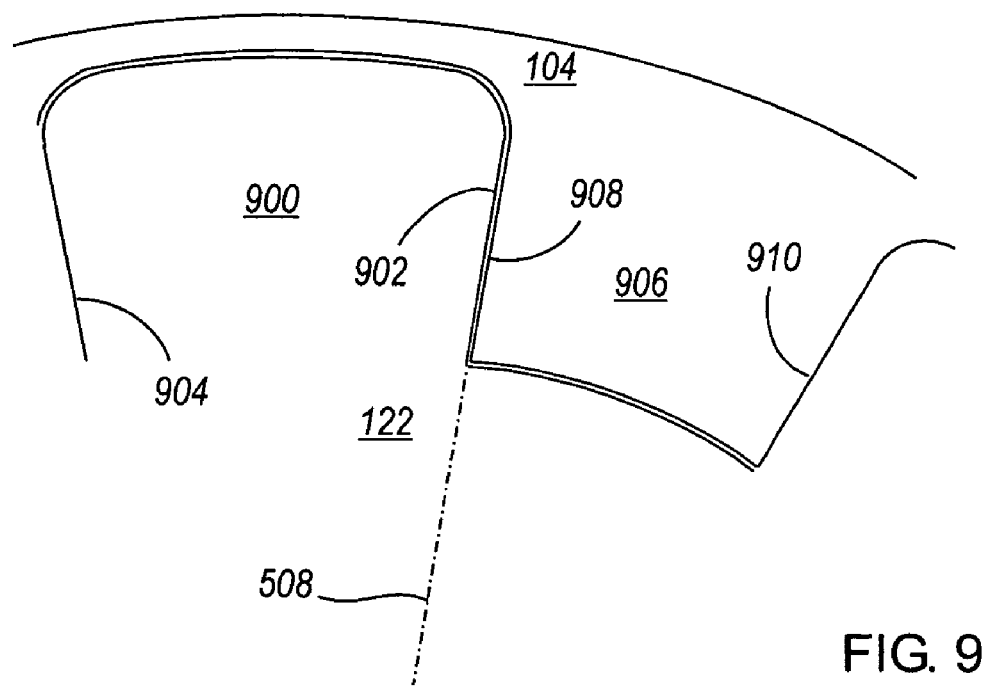

To lessen the wear and peaning of tabs 400, 402, 500, 502 and lugs 600, 700, the leading and trailing flanks 410, 412, 510, 512, 602, 604, 702, 704 (or sides) of at least some (and preferably all) of the tabs and lugs are designed to be substantially radial. See FIGS. 4-7. That is, the tabs 400, 500 and lugs 600, 700 may be provided with flanks 410, 602, 510, 702 that are substantially parallel to radial lines 408, 508 extending outward from the centers of the rings 120, 122, cover 104 and piston 110 (the radial lines of which should all coincide with a common axis or center). Although it is preferable that a tab's or lug's entire flank 410, 602, 510, 702 be radial (as shown in FIGS. 6 & 7), one embodiment of the invention allows the flanks 802, 804, 808, 810, 902, 904, 908, 910 of tabs 800, 900 and lugs 806, 906 to merely be "substantially" radial. For example, and as shown in FIGS. 8 & 9, the distal portions of tabs 800, 900 (and spaces between lugs) could be rounded, so long as the majorities of each tab's or lug's flanks 802, 804, 808, 810, 902, 904, 908, 910 are substantially radial.

For purposes of this description, "substantially radial" flanks are defined to include those flank orientations falling between those of a tab with parallel flanks, and those of a lug with parallel flanks. Therefore, a substantially radial flank in FIG. 6 could vary between the flank orientations denoted by lines 606 and 608. Likewise, a substantially radial flank in FIG. 7 could vary between the flank orientations denoted by lines 706 and 708.

When a ring's tabs (400 or 500) are provided with substantially radial flanks (410/412 or 510/512), and the lugs 600, 700 corresponding thereto are provided with substantially radial flanks (e.g., flanks 602 and 702), the ring (120 or 122) operates as efficiently as possible in transferring torque within a torque converter 100. Efficient torque transfer means a clutch-pack's rings 120, 122 absorb fewer of the torsionals imparted thereto, and the torsionals are instead absorbed by the cover and piston (which have a greater mass and rigidity for absorbing the torsionals). As a result, the tab and lug design illustrated in FIGS. 2-7 subjects a clutch pack's rings 120, 122 to less wear and peaning.

The tabs and lugs illustrated in FIGS. 2-7 are also beneficial in that they largely maintain their radial engagement as they wear (unlike tabs and lugs having generally roundish flanks, that tend to lose their snug fit as they wear). For example, refer to the tab and lug arrangement shown in FIG. 7. As a result of the radial engagement between flanks 510 and 702, and the similar radial engagement of all other flanks on ring 122, the flanks tend to wear evenly and maintain their radial engagement. Furthermore, even if the inner and outer circumferences of the ring 122 wear (or if the circumferences do not fit snugly to their mating surfaces when a torque converter 100 is first assembled), and the ring 122 begins to sag (i.e., as a result of the torque converter 100 having a horizontal axis of rotation and the rings having vertically aligned faces), the flanks 510 and 702 will still engage radially and tend to wear at a uniform rate.

Figure 10:
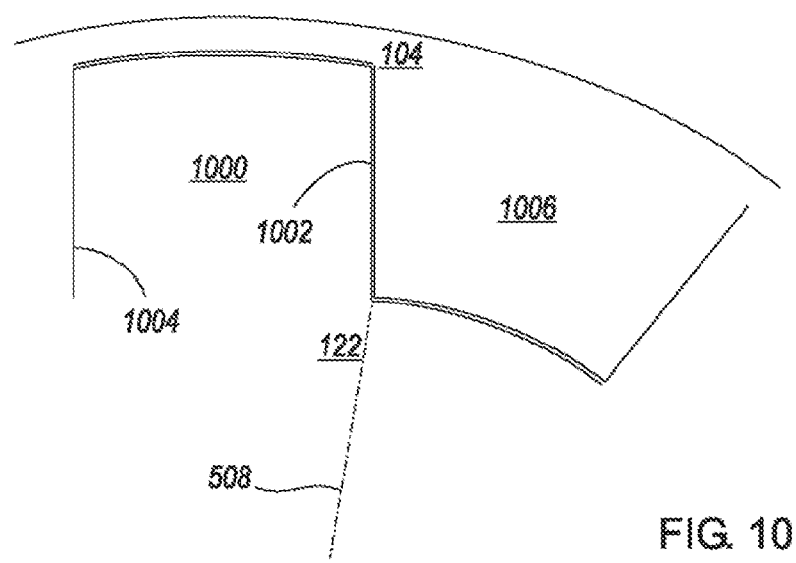
FIGS. 10 illustrates a second alternative to the tab and lug design illustrated in FIGS. 6 & 7.

In an alternate tab and lug design (1000, 1006; FIG. 10), the flanks 1002, 1004 of tabs (e.g., tab 1000) or lugs (not shown) are designed to be parallel to one another, thus resulting in generally square tabs or lugs. Although they do not transfer torque as efficiently as tabs and lugs with radial flanks, tabs and lugs comprising parallel flanks still transfer torque more efficiently than tabs and lugs comprising generally rounded flanks.

Given that the tab and lug arrangements illustrated in FIGS. 4-10 are designed to transfer a greater number of torsional forces to the cover 104 and piston 110, the cover and piston need to have a sufficient mass and rigidity to absorb the torsional forces that will be applied to them. In one embodiment of the torque converter 100, the cover 104 and piston 110 are formed of billet steel.

Figure 11:
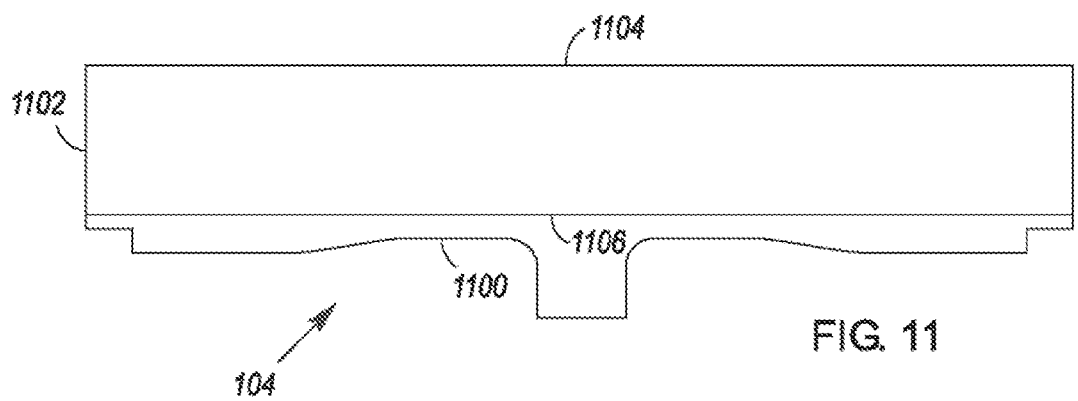
FIGS. 11 & 12 illustrate an exemplary two-piece embodiment of the torque converter cover shown in FIGS. 2 & 3.
Figure 12:
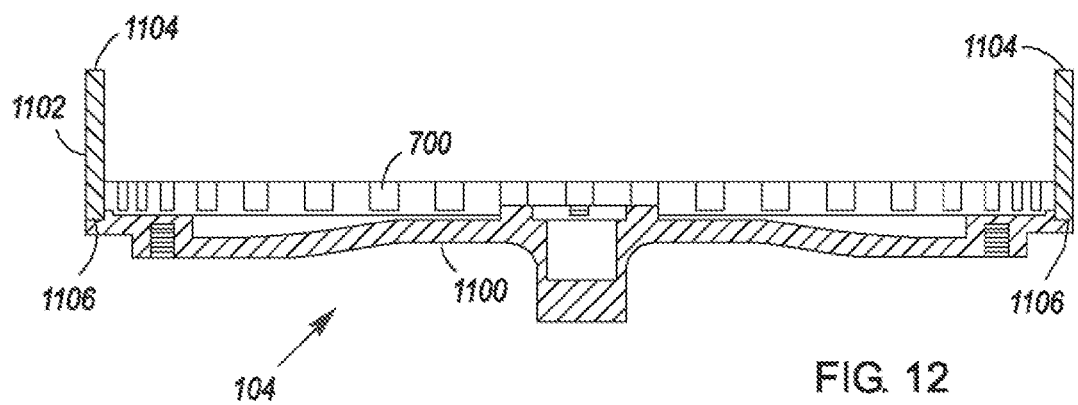

Although there are many ways to cut radial or square tabs and lugs from a torque converter's cover 104, piston 110 and rings 120, 122, cutting radial or square lugs in a torque converter's cover 104 is difficult. Typically, lugs are cut in a torque converter's cover by means of drilling or milling. However, such operations make it difficult to produce straight flanks (e.g., radial or square flanks). This is because large drill bits and milling cutters produce too great of "rounds" at the corners of a lug, and small drill bits and milling cutters require too many repetitions or passes to make cover manufacture practical. FIGS. 11 & 12 therefore illustrate a two-piece cover 104. The cover 104 comprises a base plate 1100 and a cylindrical wall piece 1102, with the cylindrical wall piece 1102 having an upper rim 1104 defining an upper open end and a lower rim 1106 defining a lower open end. In this manner, lugs 700 having straight flanks may be milled or otherwise formed in the base plate 1100 prior to fixing the base plate 1100 to the cylindrical wall piece 1102. By way of example, the base plate 1100 and cylindrical wall piece 1102 may be press fitted together (e.g., by press fitting the base plate 1100 into the lower open end defined by the lower rim 1106 of the cylindrical wall piece 1102), and then welded. Depending on the process used to press the two pieces together, one or both of the pieces may be heated to enable an easier fit. In a similar fashion, the impeller 102 may be press fit to the cylindrical wall piece 1102 thereby defining an outer shell of the torque converter.

If lugs are formed in a cover 104 as described in the preceding paragraph, the tabs 500, 502 of a clutch-pack ring 122 may extend to within a few thousandths of an inch from the wall of the cover 104.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A torque converter, comprising:
   a two piece-cover, including,
      a base plate configured for attachment to a drive member and comprising a plurality of lugs; wherein the lugs are positioned around, and are externally exposed to, the periphery of the base plate; and wherein at least some of the lugs comprise straight flanks; and
      a cylindrical wall piece having an upper rim defining an upper open end and a lower rim defining a lower open end, wherein the base plate is press fit into the lower open end of the cylindrical wall piece, and wherein the cylindrical wall piece abuts the lugs;
   an impeller, press fit to the cylindrical wall piece;
   a turbine, rotationally mounted between the impeller and the cover and configured for attachment to a driven member; and
   a lockup clutch to lock the impeller and cover to the turbine when a fluid pressure applied to the lockup clutch increases above a torque converter lockup pressure.

2. The torque converter of claim 1, wherein the base plate and cylindrical wall piece and press fit to one another.

3. The torque converter of claim 1, wherein the base plate and cylindrical wall piece are welded to one another.

4. The torque converter of claim 1, wherein the lockup clutch comprises:
   a piston, splined to and rotating with the turbine between the turbine and the cover; and
   a clutch-pack comprising a first ring that is splined to and rotates with the piston, and a second ring that is positioned between the first ring and the piston; the second ring comprising a plurality of outwardly facing tabs splined to the plurality of lugs on the cover; at least some of the outwardly facing tabs and their corresponding lugs comprising substantially radial flanks;
   wherein the piston, rings and cover frictionally engage one another as a fluid pressure between the turbine and the piston increases above a torque converter lockup pressure.

5. The torque converter of claim 4, wherein at least some of the outwardly facing tabs and their corresponding lugs comprise radial flanks.

6. The torque converter of claim 4, wherein the piston has a plurality of lugs on a surface thereof facing the second ring, and wherein the first ring has a plurality of inwardly facing tabs splined to the plurality of lugs on the piston.

7. The torque converter of claim 6, wherein at least some of the inwardly facing tabs and their corresponding lugs comprise substantially radial flanks.

8. The torque converter of claim 6, wherein at least some of the inwardly facing tabs and their corresponding lugs comprise radial flanks.

9. The torque converter of claim 4, wherein the first ring comprises a friction lining on a side thereof adjacent the cover, wherein the second ring comprises friction linings on opposite sides thereof, and wherein the cover, piston and unlined side of the first ring each comprise clutch surfaces for friction linings of the first and second rings to bear against when the piston, rings and cover frictionally engage one another.

10. The torque converter of claim 1, wherein the cover is formed of billet steel.

11. The torque converter of claim 1, wherein the lockup clutch comprises:
   a piston, splined to and rotating with the turbine between the turbine and the cover; and
   a clutch-pack comprising a first ring that is splined to and rotates with the piston, and a second ring that is positioned between the first ring and the piston; the second ring comprising a plurality of outwardly facing tabs splined to the plurality of lugs on the cover; at least some of the outwardly facing tabs comprising parallel flanks, and flanks of the lugs corresponding thereto following contours of the tabs;
   wherein the piston, rings and cover frictionally engage one another as a fluid pressure between the turbine and the piston increases above a torque converter lockup pressure.

12. The torque converter of claim 11, wherein the outwardly facing tabs comprising parallel flanks are square.

13. The torque converter of claim 11, wherein:

the piston has a plurality of lugs on a surface thereof facing the second ring;

the first ring has a plurality of inwardly facing tabs splined to the plurality of lugs on the piston; and at least some of the inwardly facing tabs comprise parallel flanks, and flanks of the lugs corresponding thereto follow countours of the tabs.

14. The torque converter of claim 13, wherein the inwardly facing tabs comprising parallel flanks are square.

15. The torque converter of claim 11, wherein the first ring comprises a friction lining on a side thereof adjacent the cover, wherein the second ring comprises friction lining on opposite sides thereof, and wherein the cover, piston and unlined side of the first ring each comprise clutch surfaces for friction linings of the first and second rings to bear against when the piston, rings and cover frictionally engage one another.

16. A method of making a torque converter, comprising:

forming a plurality of lugs, at least some of which have straight flanks, around the periphery of a base plate, wherein the base plate is configured for attachment to a drive member;

after formation of the lugs, fixing a cylindrical wall piece to the base plate to form a cover, the cylindrical wall piece having an upper rim defining an upper open end and a lower rim defining a lower open end, the cylindrical wall piece being fixed to the base plate by pressing the base plate into the lower open end of the cylindrical wall piece so that the cylindrical wall piece abuts the lugs;

press fitting an impeller to the cylindrical wall piece;

prior to fixing the impeller to the cylindrical wall piece, rotationally mounting a turbine between the impeller and the cover, wherein the turbine is configured for attachment to a driven member; and forming a lockup clutch between the impeller and the cover, with at least one component of the lockup clutch mating with the plurality of lugs to lock the impeller and cover to the turbine when a fluid pressure applied to the lockup clutch increases above a torque converter lockup pressure.

17. The method of claim 16, wherein the base plate and cylindrical wall piece are press fit to one another.

18. The method of claim 16, wherein the base plate and cylindrical wall piece are welded to one another.

* * * * *